US012639020B2

(12) United States Patent
Li et al.

(10) Patent No.: US 12,639,020 B2
(45) Date of Patent: May 26, 2026

(54) IMAGE TRANSMISSION METHOD, APPARATUS AND DEVICE, AND MEDIUM

(71) Applicant: ZHEJIANG UNIVIEW TECHNOLOGIES CO., LTD., Zhejiang (CN)

(72) Inventors: Lin Li, Zhejiang (CN); Xianling He, Zhejiang (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 285 days.

(21) Appl. No.: 18/027,032

(22) PCT Filed: Sep. 30, 2020

(86) PCT No.: PCT/CN2020/119440
§ 371 (c)(1),
(2) Date: Mar. 17, 2023

(87) PCT Pub. No.: WO2022/067683
PCT Pub. Date: Apr. 7, 2022

(65) Prior Publication Data
US 2023/0376259 A1 Nov. 23, 2023

(51) Int. Cl.
*G06F 3/14* (2006.01)

(52) U.S. Cl.
CPC ........ *G06F 3/14* (2013.01); *G06F 2213/0026* (2013.01)

(58) Field of Classification Search
CPC ........................... G06F 3/14; G06F 2213/0026
See application file for complete search history.

(56) References Cited

U.S. PATENT DOCUMENTS 10,645,427 B2 * 5/2020 Lee ...................... H04N 21/236
10,834,009 B2 * 11/2020 Dhanoa ................. H04L 47/528
(Continued)

FOREIGN PATENT DOCUMENTS

CN 1885747 A 12/2006
CN 101043620 A 9/2007
(Continued)

OTHER PUBLICATIONS

International Search Report in Application No. PCT/CN2020/119440 dated Jun. 24, 2021, 4 pages, including translation.
(Continued)

*Primary Examiner* — Christopher A Daley
(74) *Attorney, Agent, or Firm* — MASCHOFF BRENNAN

(57) ABSTRACT

The invention relates to an image transmission method, electronic device, and a medium. The image transmission method comprises: according to a data volume of a to-be-transmitted image frame in each channel of a sending terminal and a transmission bandwidth between the sending terminal and a receiving terminal, determining a respective transmission time needed by the sending terminal to transmit the to-be-transmitted image frame in each channel; according to the respective transmission time needed by the sending terminal to transmit the to-be-transmitted image frame in each channel, segmenting theoretical time needed by the sending terminal to transmit to-be-transmitted image frames in multiple channels to obtain a respective time duration corresponding to each transmission time; and controlling the sending terminal to send the to-be-transmitted image frame corresponding to each transmission time to the receiving terminal within the respective time duration corresponding to each transmission time.

18 Claims, 10 Drawing Sheets

(56) References Cited

U.S. PATENT DOCUMENTS

| | | | | |
|---|---|---|---|---|
| 10,893,325 | B2 * | 1/2021 | Cheong | G06F 1/3265 |
| 11,902,091 | B2 * | 2/2024 | Alameh | G06F 3/011 |
| 12,130,612 | B2 * | 10/2024 | Brain | H04N 7/18 |
| 2003/0067552 | A1 | 4/2003 | Leyvi et al. | |
| 2015/0289279 | A1 | 10/2015 | Xu et al. | |
| 2015/0326481 | A1 * | 11/2015 | Rector | H04W 72/56 |
| | | | | 370/236 |
| 2016/0366454 | A1 * | 12/2016 | Tatourian | G06F 3/14 |
| 2017/0324634 | A1 * | 11/2017 | Yermakov | H04L 43/022 |
| 2017/0366435 | A1 * | 12/2017 | Oshiba | H04L 43/026 |
| 2018/0027130 | A1 * | 1/2018 | Yermakov | H04M 15/61 |
| | | | | 455/405 |
| 2018/0123901 | A1 * | 5/2018 | Yermakov | H04L 43/0894 |
| 2018/0262934 | A1 * | 9/2018 | Rivard | H04W 24/08 |
| 2018/0288081 | A1 * | 10/2018 | Yermakov | H04L 63/1425 |
| 2019/0394462 | A1 * | 12/2019 | Miyagoshi | H04N 21/2385 |
| 2020/0342350 | A1 * | 10/2020 | Madar, III | G06F 12/1036 |
| 2024/0143263 | A1 * | 5/2024 | Luo | G06F 3/14 |

FOREIGN PATENT DOCUMENTS

| | | | |
|---|---|---|---|
| CN | 102239696 | A | 11/2011 |
| CN | 107707626 | A | 2/2018 |
| CN | 108924601 | A | 11/2018 |
| CN | 109451574 | A | 3/2019 |
| CN | 109640067 | A | 4/2019 |
| CN | 110769264 | A | 2/2020 |
| EP | 3681129 | A1 | 7/2020 |
| JP | 2003060602 | A | 2/2003 |
| WO | 2016165375 | A1 | 10/2016 |

OTHER PUBLICATIONS

Extended European Search Report for Application No. 20955708.1, dated Mar. 20, 2024, 11 pages.

Chinese Office Action for Application No. 202080104910.8, dated Feb. 14, 2025, 17 pages including translation.

Chinese Notice of Grant for Application No. 202080104910.8, dated Jun. 12, 2025, 6 pages including translation.

Luo, Ming-shi, et al., "Application of supervisory control and data acquisition to basic station system," Student Edition of the Journal of Hunan University of Science and Technology (Natural Science Edition), vol. 25, No. 3, Sep. 25, 2010, Sep. 2010.

* cited by examiner

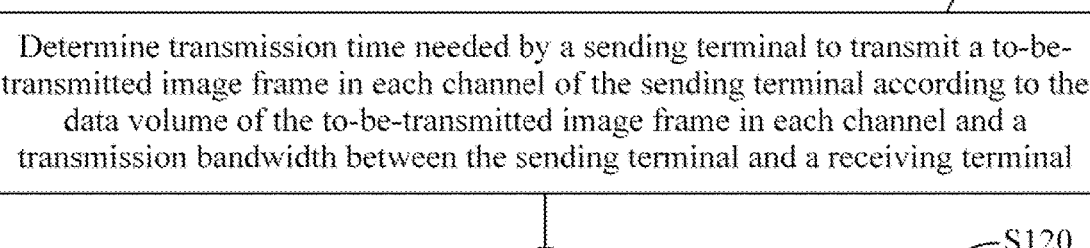

S110

Determine transmission time needed by a sending terminal to transmit a to-be-transmitted image frame in each channel of the sending terminal according to the data volume of the to-be-transmitted image frame in each channel and a transmission bandwidth between the sending terminal and a receiving terminal

S120

Segment theoretical time needed by the sending terminal to transmit to-be-transmitted images according to the transmission time required by the sending terminal to transmit the to-be-transmitted image frame in each channel so that a time duration corresponding to the transmission time is obtained

S130

Control the sending terminal to send the to-be-transmitted image frame corresponding to each transmission time to the receiving terminal within the time duration corresponding to each transmission time

FIG. 1

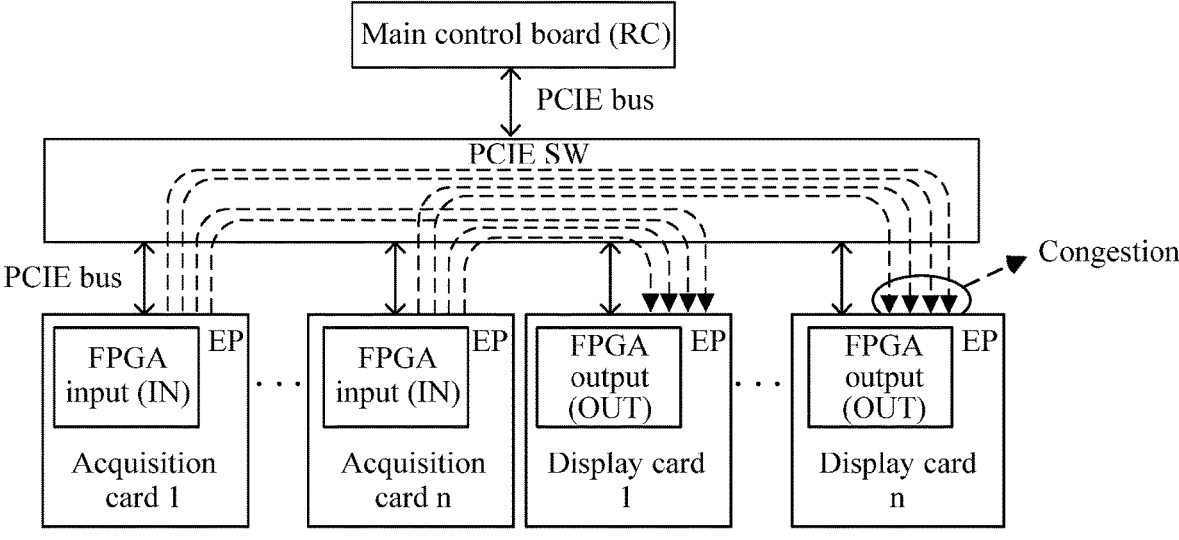

Main control board (RC)

PCIE bus

PCIE SW

PCIE bus

Congestion

FPGA input (IN)  EP

Acquisition card 1

FPGA input (IN)  EP

Acquisition card n

FPGA output (OUT)  EP

Display card 1

FPGA output (OUT)  EP

Display card n

FIG. 2

IMAGE TRANSMISSION METHOD, APPARATUS AND DEVICE, AND MEDIUM

CROSS REFERENCE TO RELATED APPLICATIONS

This application is a national stage application filed under 35 U.S.C. 371 based on International Patent Application No. PCT/CN2020/119440, filed on Sep. 30, 2020, the disclosure of which is incorporated herein by reference in its entirety.

TECHNICAL FIELD

The present application relates to the field of image transmission, for example, an image transmission method and apparatus, a device and a medium.

BACKGROUND

With the rapid development of technology, users have gradually increased requirements for image display clarity, and gradually pursue ultra high definition image display quality. Ultra high definition image display means that the image resolution is improved while the fluency of image display is ensured, that is, the volume of data transmitted per unit of time is greatly increased.

Field-programmable gate arrays (FPGAs) are gradually applied in the technical field of image acquisition, processing and display due to powerful functions, flexibility, low costs and other advantages. In the distributed application scene of FPGA+Peripheral Component Interconnect Express (PCIe), an FPGA serves as an Endpoint (EP) to send or receive data, and the volume of data which can be received or sent per unit of time by the FPGA is often limited by the bandwidth of PCIe. In the process of image acquisition and sending by multiple acquisition cards corresponding to a display card or by multiple acquisition cards corresponding to multiple display cards, the increase of the volume of data transmitted in a unit of time by the FPGA of the acquisition card often causes an instantaneous congestion of PCIe data packets of the display card, thereby leading to image playing freezing.

To solve the preceding image freezing caused by the consequent congestion of data packets, three technical means are commonly used, that is, expanding the bandwidth from hardware, transmitting an image after compression or stopping transmission after congestion occurs. However, the solution of expanding the bandwidth from hardware solves the problem of image freezing, but increases the hardware costs and reduces the bandwidth utilization of PCIe. The solution of transmitting an image after compression reduces image quality. The solution of stopping transmission after congestion occurs reduces system resource utilization.

SUMMARY

The present application provides an image transmission method and apparatus, a device and a medium, so as to achieve orderly and rapid transmission and display of high-resolution images An image transmission method is provided and includes steps described below.

A respective transmission time needed by a sending terminal to transmit a to-be-transmitted image frame in each channel of multiple channels of the sending terminal is determined according to a data volume of the to-be-transmitted image frame in each channel and a transmission bandwidth between the sending terminal and a receiving terminal.

Theoretical time needed by the sending terminal to transmit the to-be-transmitted image frame is segmented according to the respective transmission time needed by the sending terminal to transmit the to-be-transmitted image frame in each channel to obtain a respective time duration corresponding to each transmission time.

The sending terminal is controlled to send the to-be-transmitted image frame corresponding to each transmission time to the receiving terminal within the respective time duration corresponding to each transmission time.

An image transmission apparatus is further provided and includes a transmission time determination module, a segmentation module and a control module.

The transmission time determination module is configured to, according to a data volume of a to-be-transmitted image frame in each channel of multiple channels of a sending terminal and a transmission bandwidth between the sending terminal and a receiving terminal, determine a respective transmission time needed by the sending terminal to transmit the to-be-transmitted image frame in each channel.

The segmentation module is configured to, according to the transmission time needed by the sending terminal to transmit the to-be-transmitted image frame in each channel, segment theoretical time needed by the sending terminal to transmit the to-be-transmitted image frame to obtain a respective time duration corresponding to each transmission time.

The control module is configured to control the sending terminal to send the to-be-transmitted image frame corresponding to each transmission time to the receiving terminal within the respective time duration corresponding to each transmission time.

An electronic device is further disclosed.

The electronic device includes at least one processor and a memory communicatively connected to the at least one processor.

The memory stores instructions executable by the at least one processor to cause the at least one processor to perform the preceding image transmission method.

A non-transitory computer-readable storage medium storing computer instructions is further disclosed. The computer instructions are used for causing a computer to perform the preceding image transmission method.

BRIEF DESCRIPTION OF DRAWINGS

FIG. 1 is a flowchart of an image transmission method according to an embodiment of the present application;

FIG. 2 is a diagram showing an FPGA+PCIe distributed application system according to an embodiment of the present application;

DETAILED DESCRIPTION

Figure 3:
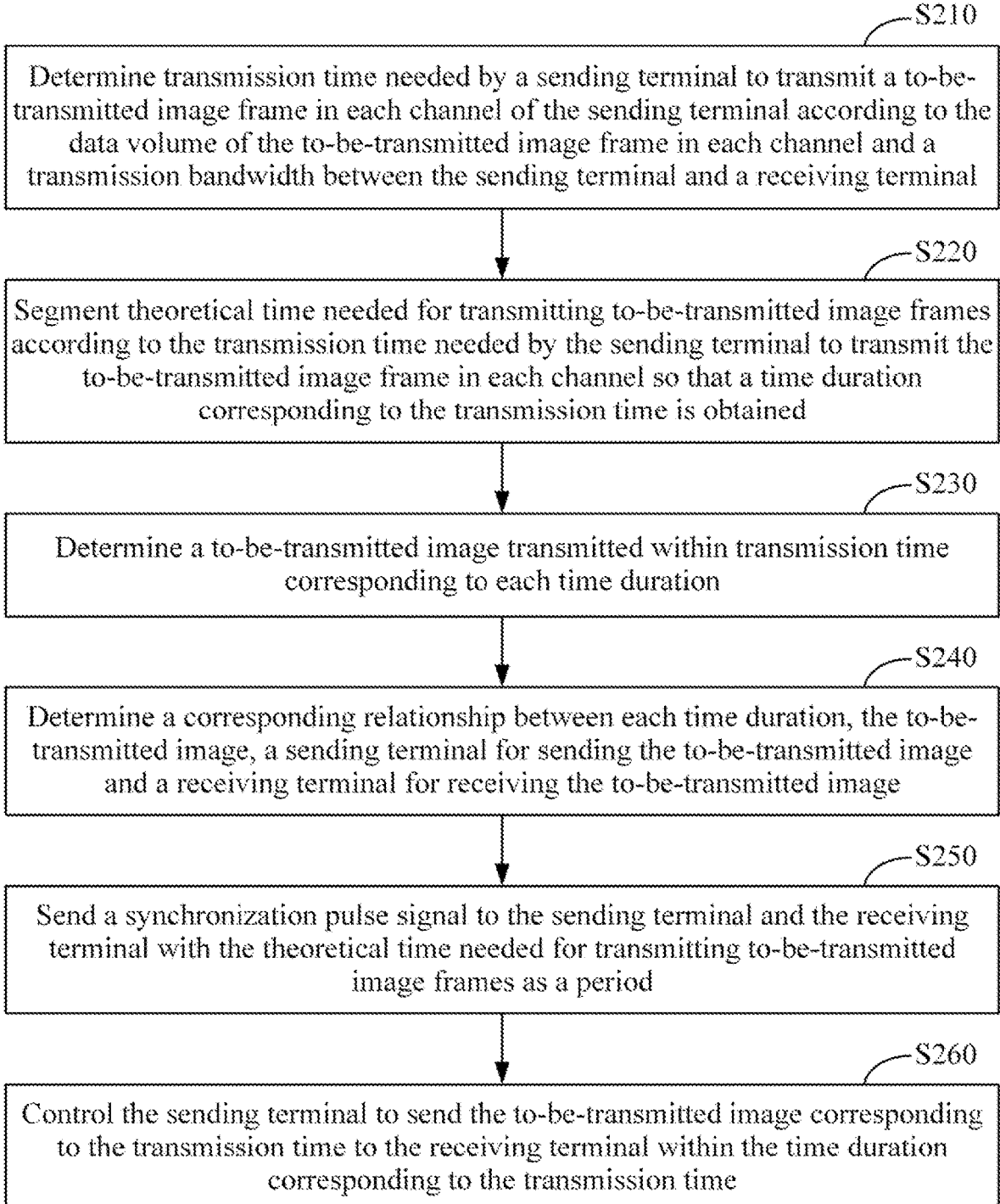
FIG. 3 is a flowchart of another image transmission method according to an embodiment of the present application.

Example embodiments of the present application, including details of embodiments of the present application, are described hereinafter in conjunction with the drawings to facilitate understanding. The example embodiments are merely illustrative.

In an embodiment of the present application, a sending terminal may be a node on the side where image data flow out, and a receiving terminal may be a node on the side where image data flow in. Devices for serving as the sending terminal and the receiving terminal are not unique. For example, the sending terminal may be an acquisition card, a server, a single-chip microcomputer, etc., and the receiving terminal may be a display card, a memory, etc. A data transmission protocol or an intermediate device between the sending terminal and the receiving terminal depends on devices serving as the sending terminal and the receiving terminal. For example, if the sending terminal is an acquisition card and the receiving terminal is a display card, a Peripheral Component Interconnect Express (PCIe) bus may be used as the data transmission protocol.

FIG. 1 is a flowchart of an image transmission method according to an embodiment of the present application. The embodiment is applicable to a case where a sending terminal transmits images to a receiving terminal. For example, the embodiment is applicable to a case where multiple sending terminals send images to one receiving terminal, or multiple sending terminals send images to multiple receiving terminals. The image transmission method disclosed in the embodiment may be performed by an image transmission apparatus, which may be implemented by software and/or hardware and may be integrated in an electronic device. Referring to FIG. 1, the image transmission method provided in the embodiment includes steps described below.

In S110, transmission time needed by a sending terminal to transmit a to-be-transmitted image frame in each channel of the sending terminal is determined according to a data volume of the to-be-transmitted image frame in each channel and a transmission bandwidth between the sending terminal and a receiving terminal.

A to-be-transmitted image is an image acquired from the sending terminal and sent to the receiving terminal. FIG. 2 is a diagram showing a field programmable gate array (FPGA)+PCIe distributed application system according to an embodiment of the present application. As shown in FIG. 2, the system may include a main control board, multiple acquisition cards and multiple display cards. The structure and form of the main control board are not limited, as long as the main control board is a device capable of managing and controlling the acquisition cards and the display cards. Multiple acquisition cards may separately send images in multiple channels to any display card, that is, a display card may receive images in the multiple channels from the multiple acquisition cards. Four images transmitted in multiple channels in FIG. 2 do not means a limitation on the number of to-be-transmitted images. In practice, any number of images may be transmitted. In this system, when multiple acquisition cards simultaneously send images to one display card, the bandwidth of the display card may be overloaded instantaneously, thus the images cannot be received normally and are pressed back to the acquisition cards, and then the images are sent alternately, resulting in a decrease in the transmission frame rate and a phenomenon of freezing during display and playing of the display card.

In the embodiment of the present application, the main control board manages and controls the image sending process of the acquisition cards so that multiple acquisition cards can send images to the same display card in an orderly manner, thereby improving the efficiency of image sending. In the embodiment of the present application, to specify the time taken by each acquisition card to transmit an image for managing and controlling each acquisition card, all acquisition cards needing to send images to a display card and the data volume of a to-be-transmitted image that each acquisition card needs to send to the display card are predetermined. The transmission time needed for transmitting a to-be-transmitted image frame in each channel may be calculated according to the data volume of the to-be-transmitted image and the transmission bandwidth. The transmission bandwidth is a PCIe transmission bandwidth between Endpoints (EP). In an embodiment, the ratio of the data volume of the to-be-transmitted image frame to the transmission bandwidth is the transmission time needed for transmitting the to-be-transmitted image frame in each channel.

In the preceding solution, the transmission time needed for transmitting the to-be-transmitted image frame in each channel is predetermined, so that transmission time needed for transmitting the to-be-transmitted image frame by multiple acquisition cards can be comprehensively and integrally controlled, and thus the image sending process of the acquisition cards can be effectively controlled according to the transmission time needed for transmitting the to-be-transmitted image.

In S120, theoretical time needed by the sending terminal to transmit to-be-transmitted image frames in multiple channels is segmented according to the transmission time needed by the sending terminal to transmit the to-be-transmitted image frame in each channel so that a time duration corresponding to each transmission time is obtained.

Each to-be-transmitted image frame of each acquisition card has a respective transmission time, which is the time needed for transmitting each to-be-transmitted image frame. To solve the problem of congestion on a display card when multiple acquisition cards simultaneously send images to the display card, in the embodiment of the present application, for one display card, all acquisition cards which need to send images to the display card are determined, and then all to-be-transmitted images which need to be sent to the display card are determined. Transmission time corresponding to all to-be-transmitted images is determined, and then theoretical time corresponding to transmitting all to-be-transmitted images is segmented according to each transmission time.

Exemplarily, to-be-transmitted images which acquisition card 1 needs to send to a display card 1 are an image 1, an image 2 and an image 3, the transmission time needed for transmitting the image 1 is $t1$, the transmission time needed for transmitting the image 2 is $t2$, and the transmission time needed for transmitting the image 3 is $t3$. To-be-transmitted images which acquisition card 2 needs to send to the display card 1 are an image 1', an image 2' and an image 3', the transmission time needed for transmitting the image 1' is $t4$, the transmission time needed for transmitting the image 2' is $t5$, and the transmission time needed for transmitting the image 3' is $t6$. Then, the time corresponding to transmitting the to-be-transmitted images may be divided into 6 durations corresponding to $t1$, $t2$, $t3$, $t4$, $t5$ and $t6$, respectively. That is, the theoretical time corresponding to transmitting the to-be-transmitted images is divided into 6 durations, that is, $0-t1$, $t1-(t1+t2)$, $(t1+t2)-(t1+t2+t3)$, $(t1+t2+t3)-(t1+t2+t3+t4)$, $(t1+t2+t3+t4)-(t1+t2+t3+t4+t5)$, and $(t1+t2+t3+t4+t5)-(t1+t2+t3+t4+t5+t6)$.

In the embodiment of the present application, the order of the time durations obtained by segmenting the theoretical time corresponding to transmitting a to-be-transmitted image frame is not limited. For example, in the preceding example, 6 time durations correspond to $t1$, $t2$, $t3$, $t4$, $t5$ and $t6$, respectively. Alternatively, the 6 time durations obtained through segmentation may correspond to $t3$, $t5$, $t2$, $t1$, $t6$ and $t4$, respectively, or correspond to transmission time in another order, which is not limited here.

In the preceding solution, the theoretical time corresponding to transmitting a to-be-transmitted image frame is segmented according to the time needed for transmitting a to-be-transmitted image frame in each channel, so that multiple frames of to-be-transmitted images are staggered in time durations for orderly management and control.

In S130, the sending terminal is controlled to send the to-be-transmitted image frame corresponding to each transmission time to the receiving terminal within the time duration corresponding to each transmission time.

In the embodiment of the present application, when the time duration for each acquisition card to send a to-be-transmitted image is about to be reached, a control instruction may be issued to an acquisition card so that the acquisition card is controlled to send to-be-transmitted data within the corresponding time duration; or a control instruction may be sent to all acquisition cards in advance so that the acquisition cards are controlled to send to-be-transmitted data when the corresponding time duration is reached. The acquisition card may also actively acquire a control instruction from the main control board.

Exemplarily, S120 is taken as an example for illustration. If the theoretical time corresponding to transmitting a to-be-transmitted image is divided into 6 durations corresponding to $t1$, $t2$, $t3$, $t4$, $t5$ and $t6$, respectively, then acquisition card 1 is controlled to send image 1 to display card 1 within the time duration of $0-t1$, acquisition card 1 is controlled to send image 2 to display card 1 within the time duration of $t1-(t1+t2)$, acquisition card 1 is controlled to send image 3 to display card 1 within the time duration of $(t1+t2)-(t1+t2+t3)$, acquisition card 2 is controlled to send image 1' to display card 1 within the time duration of $(t1+t2+t3)-(t1+t2+t3+t4)$, acquisition card 2 is controlled to send image 2' to display card 1 within the time duration of $(t1+t2+t3+t4)-(t1+t2+t3+t4+t5)$, and acquisition card 2 is controlled to send image 3' to display card 1 within the time duration of $(t1+t2+t3+t4+t5)-(t1+t2+t3+t4+t5+t6)$; therefore, orderly and rapid transmission of images from multiple acquisition cards to a display card is achieved.

If the theoretical time corresponding to transmitting a to-be-transmitted image is divided into 6 durations corresponding to $t3$, $t5$, $t2$, $t1$, $t6$ and $t4$, respectively, then acquisition card 1 is controlled to send image 3 to display card 1 within the time duration of $0-t3$, acquisition card 2 is controlled to send image 2' to display card 1 within the time duration of $t3-(t3+t5)$, acquisition card 1 is controlled to send image 2 to display card 1 within the time duration of $(t3+t5)-(t3+t5+t2)$, acquisition card 1 is controlled to send image 1 to display card 1 within the time duration of $(t3+t5+t2)-(t3+t5+t2+t1)$, acquisition card 2 is controlled to send image 3' to display card 1 within the time duration of $(t3+t5+t2+t1)-(t3+t5+t2+t1+t6)$, and acquisition card 2 is controlled to send image 1' to display card 1 within the time duration of $(t3+t5+t2+t1+t6)-(t3+t5+t2+t1+t6+t4)$. The preceding is merely examples, and other situations are possible. The order of segmentation and the order of image transmission may be determined according to actual situations.

In the preceding solution, multiple acquisition cards can send to-be-transmitted images to the same display card in a staggered manner, so that the order and transmission speed of sending the to-be-transmitted images to the display card are improved, and the images can be transmitted quickly and played smoothly under the premise that the image quality is ensured.

In the technical solution of the embodiment of the present application, the theoretical time corresponding to transmitting a to-be-transmitted image frame is segmented according to the transmission time needed for transmitting a to-be-transmitted image frame in each channel, so that multiple frames of to-be-transmitted images in multiple channels are controlled to be transmitted in order during different time durations, and orderly and rapid transmission of high-resolution images is achieved on the premise that the image quality is ensured.

FIG. 3 is a flowchart of another image transmission method according to an embodiment of the present application. The embodiment of the present application is an optional solution provided based on the preceding embodiment. Referring to FIG. 3, the image transmission method provided in the embodiment of the present application includes steps described below.

In S210, transmission time needed by a sending terminal to transmit a to-be-transmitted image frame in each channel of the sending terminal is determined according to a data volume of the to-be-transmitted image frame in each channel and a transmission bandwidth between the sending terminal and a receiving terminal.

In S220, theoretical time needed for transmitting to-be-transmitted image frames is segmented according to the transmission time needed by the sending terminal to transmit a to-be-transmitted image frame in each channel so that a time duration corresponding to the transmission time is obtained.

In the embodiment of the present application, the step in which the theoretical time corresponding to transmitting a to-be-transmitted image frame is segmented according to the transmission time needed by the sending terminal to transmit a to-be-transmitted image frame in each channel so that the time duration corresponding to the transmission time is obtained includes steps described below. In a case where transmitting a to-be-transmitted image frame in multiple channels separately needs the same transmission time, a preset number is determined according to the number of channels of the sending terminal and/or a ratio of the theoretical time corresponding to transmitting a to-be-transmitted image frame to the transmission time; and average segmentation is performed on the theoretical time corresponding to transmitting a to-be-transmitted image frame according to the preset number so that a preset number of time durations are obtained. The step in which the preset number is determined according to the number of channels of the sending terminal and/or the ratio of the theoretical time corresponding to transmitting a to-be-transmitted image frame to the transmission time includes: setting the preset number to be equal to the number of channels of the sending terminal; setting the preset number to be equal to the ratio of the theoretical time corresponding to transmitting a to-be-transmitted image frame to the transmission time; or setting the preset number to a value between the number of channels of the sending terminal and the ratio.

Exemplarily, it is assumed that acquisition card 1 and acquisition card n acquire and send to-be-transmitted images in 4 channels with the resolution of 1920*1200 and in the YUV422 format to display card 1 and display card n, respectively, each acquisition card output 4 to-be-transmitted images in multiple channels, and each display card is input into 4 to-be-transmitted images in multiple channels. Therefore, as long as it is ensured that the transmission of 4 to-be-transmitted image frames corresponding to 4 channels, respectively, is completed within the theoretical time corresponding to transmitting a to-be-transmitted image frame, thus the theoretical time corresponding to transmitting a to-be-transmitted image frame may be divided into 4 durations on average. The PCIe bandwidth between the acquisition card and the display card is X2, and it can be seen according to the utilization of the PCIe bandwidth that the actual effective bandwidth of the PCIe bandwidth is 6.6 Gigabits per second (Gbps), that is, the bandwidth threshold between the sending terminal and the receiving terminal is 6.6 Gbps. Image data is transmitted between the acquisition card and the display card at the rate of 30 frames/seconds, and it can be calculated that the bandwidth occupied by a to-be-transmitted image in one channel satisfies that $1920*1200*16*30/1000/1000/1000=1.1$ Gbps. For the acquisition card and the display card, 6 to-be-transmitted image frames corresponding to 6 channels, respectively, can be sent and received within the theoretical time (T=1/30 s) corresponding to transmitting a to-be-transmitted image frame. Therefore, the theoretical time corresponding to transmitting a to-be-transmitted image frame may be divided into 6 durations on average so as to satisfy the requirement for the transmission time of the to-be-transmitted image in each channel. The preset number may also be set to between 4 and 6. For example, the preset number is 5, and thus the theoretical time corresponding to transmitting to-be-transmitted image frames is divided into 5 durations on average.

In S230, a to-be-transmitted image transmitted within transmission time corresponding to each time duration is determined.

Exemplarily, the theoretical time corresponding to transmitting to-be-transmitted image frames is segmented according to the transmission time, each time duration actually corresponds to the transmission time, the transmission time is the time needed for transmitting a to-be-transmitted image frame, and each piece of transmission time corresponds to a to-be-transmitted image; therefore, the to-be-transmitted image corresponding to each time duration can be determined.

If the theoretical time corresponding to transmitting to-be-transmitted image frames is divided into 6 durations, that is, 0–t1, t1–(t1+t2), (t1+t2)–(t1+t2+t3), (t1+t2+t3)–(t1+t2+t3+t4), (t1+t2+t3+t4)–(t1+t2+t3+t4+t5) and (t1+t2+t3+t4+t5)–(t1+t2+t3+t4+t5+t6) corresponding to t1, t2, t3, t4, t5 and t6, respectively, t1 is the time needed for transmitting image 1, corresponding to image 1; t2 is the time needed for transmitting image 2, corresponding to image 2; t3 is the time needed for transmitting image 3, corresponding to image 3; t4 is the time needed for transmitting image 1', corresponding to image 1'; t5 is the time needed for transmitting image 2', corresponding to image 2'; and t6 is the time needed for transmitting image 3', corresponding to image 3'. Thus, with the transmission time as a connection, the to-be-transmitted image corresponding to each time duration is determined.

In S240, a corresponding relationship between each time duration, the to-be-transmitted image, a sending terminal for sending the to-be-transmitted image and a receiving terminal for receiving the to-be-transmitted image is established.

In the embodiment of the present application, the corresponding relationship is established so that the sending terminal sends the to-be-transmitted image according to the corresponding relationship. The process of establishing the corresponding relationship may be performed before the transmission of all images starts; or the step of establishing the corresponding relationship is performed again when it is detected that the acquisition card needs to send a new to-be-transmitted image to the display card in the process of image transmission.

The above is illustrated through examples. A corresponding relationship between the time duration of 0–t1, the to-be-transmitted image, that is, image 1, the sending terminal, that is, acquisition card 1, and the receiving terminal, that is, display card 1 is established so that acquisition card 1 sends image 1 to display card 1 within the time duration of 0–t1 according to the corresponding relationship. A corresponding relationship between the time duration of t1–(t1+t2), the to-be-transmitted image, that is, image 2, the sending terminal, that is, acquisition card 1, and the receiving terminal, that is, display card 1 is established so that acquisition card 1 sends image 2 to display card 1 within the time duration t1–(t1+t2) according to the corresponding relationship. In this manner, the corresponding relationship between each time duration, the corresponding to-be-transmitted image, the sending terminal for sending the to-be-transmitted image and the receiving terminal for receiving the to-be-transmitted image so that the acquisition card is instructed to send to-be-transmitted images in order.

In the preceding solution, the corresponding relationship is pre-established, so that the acquisition card performs orderly image transmission according to the corresponding relationship; therefore, the image transmission efficiency is improved while the image quality is ensured and the hardware structure is not changed.

In the embodiment of the present application, if at least two sending terminals exist, the step in which the corresponding relationship between the time duration, the to-be-transmitted image, the sending terminal for sending the to-be-transmitted image and the receiving terminal for receiving the to-be-transmitted image is established includes steps described below. Multiple time durations are traversed from a starting moment, and whether the receiving terminal is allocated an established corresponding relationship within a current time duration is determined; and in a case where the receiving terminal is not allocated an established corresponding relationship within the current time duration, a sending terminal which is not allocated an established corresponding relationship within the current time period is determined, and a corresponding relationship between the current time duration, the sending terminal, a to-be-transmitted image waiting for allocation of the sending terminal and the receiving terminal is established.

Exemplarily, multiple time durations may correspond to the same or different transmission time. If at least two to-be-transmitted image frames need the same transmission time during the transmission, the same time duration may correspond to at least two to-be-transmitted image frames. In the embodiment of the present application, the corresponding relationship may also be established according to the allocation situation of the sending terminal and the allocation situation of the receiving terminal within each time duration. Exemplarily, the time duration of 0–T1 corresponds to to-be-transmitted image 1″ and to-be-transmitted image 2″, to-be-transmitted image 1″ is to be sent by acquisition card 1, and to-be-transmitted image 2″ is to be sent by acquisition card 2. Within the time duration of 0–T1, display card 1 is not allocated an established corresponding relationship, and acquisition card 1 and acquisition card 2 are also not allocated an established corresponding relationship; thus acquisition card 1 may be selected so that the corresponding relationship between the time duration 0–T1, to-be-transmitted image 1″, acquisition card 1 and display card 1 is established. The time duration of 0–T1 of display card 1 is allocated an established corresponding relationship, and the time duration of T1–2T1 of display card 1 is not allocated an established corresponding relationship; therefore, the corresponding relationship between the time duration of T1–2T1, to-be-transmitted image 2″, acquisition card 2 and display card 1 is established.

It is similar for display card 2. Display card 2 is not allocated an established corresponding relationship within the time duration of 0–T1, acquisition card 1 is allocated an established corresponding relationship within the time duration of 0–T1, and acquisition card 2 is not allocated an established corresponding relationship within the time duration of 0–T1; thus the corresponding relationship between the time duration of 0–T1, acquisition card 2, to-be-transmitted image 3″ and display card 2 is established. Display card 2 is not allocated an established corresponding relationship within the time duration of T2–2T1, acquisition card 2 is allocated an established corresponding relationship within the time duration of T2–2T1, and acquisition card 1 is not allocated an established corresponding relationship within the time duration of T1–2T1; thus the corresponding relationship between the time duration of T1–2T1, acquisition card 1, to-be-transmitted image 4″ and display card 2 is established. Similar operations are performed until corresponding relationships between all to-be-transmitted images, acquisition cards sending the to-be-transmitted images and corresponding display cards are established, or theoretical time corresponding to transmitting to-be-transmitted image frames is allocated an established corresponding relationship with the acquisition card and the display card.

In the preceding solution, the corresponding relationship between the time duration, the to-be-transmitted image, the sending terminal and the receiving terminal can be accurately and efficiently established, so that the acquisition card can send images in order according to the corresponding relationship.

In S250, a synchronization pulse signal is sent to the sending terminal and the receiving terminal with the theoretical time needed for transmitting to-be-transmitted image frames as a period.

Exemplarily, a synchronization pulse signal is sent to the sending terminal and the receiving terminal so that the sending terminal is instructed to start sending of a to-be-transmitted image and the receiving terminal is instructed to synchronously start reception of the to-be-transmitted image.

Figure 4:
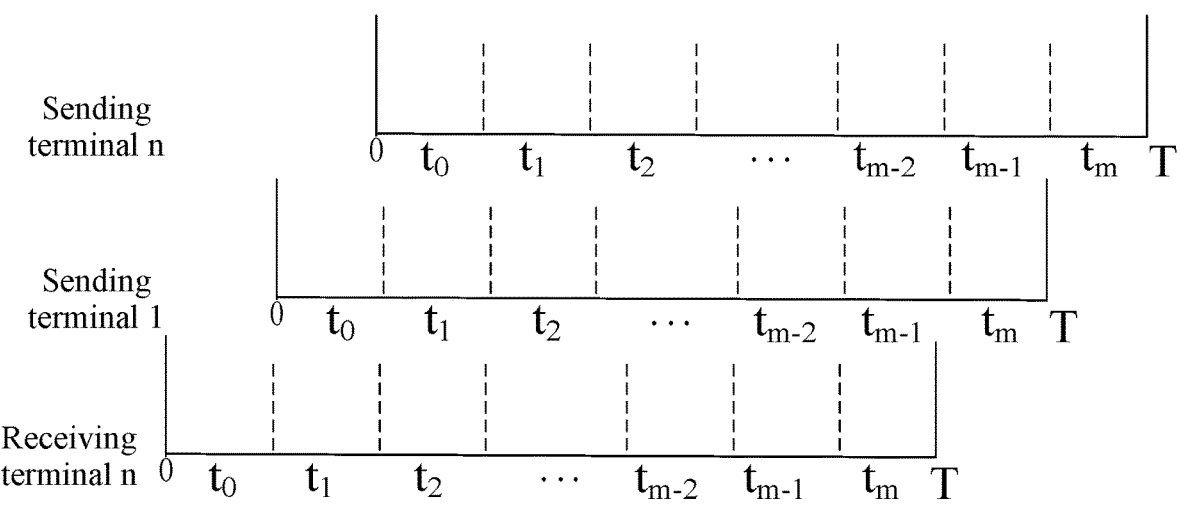
FIG. 4 is a diagram showing time slice staggering of sending terminals and a receiving terminal according to an embodiment of the present application.

Since time points at which data transmission or data reception between different sending terminals and receiving terminals is started are not necessarily uniform, time slices between multiple devices may not correspond to each other. As shown in FIG. 4, time slice $t_0$ of sending terminal n corresponds to time slice $t_1$ of sending terminal 1 and corresponds to time slice $t_2$ of receiving terminal n, leading to the disorder of image data transmission and the randomness of congestion.

Figure 5:
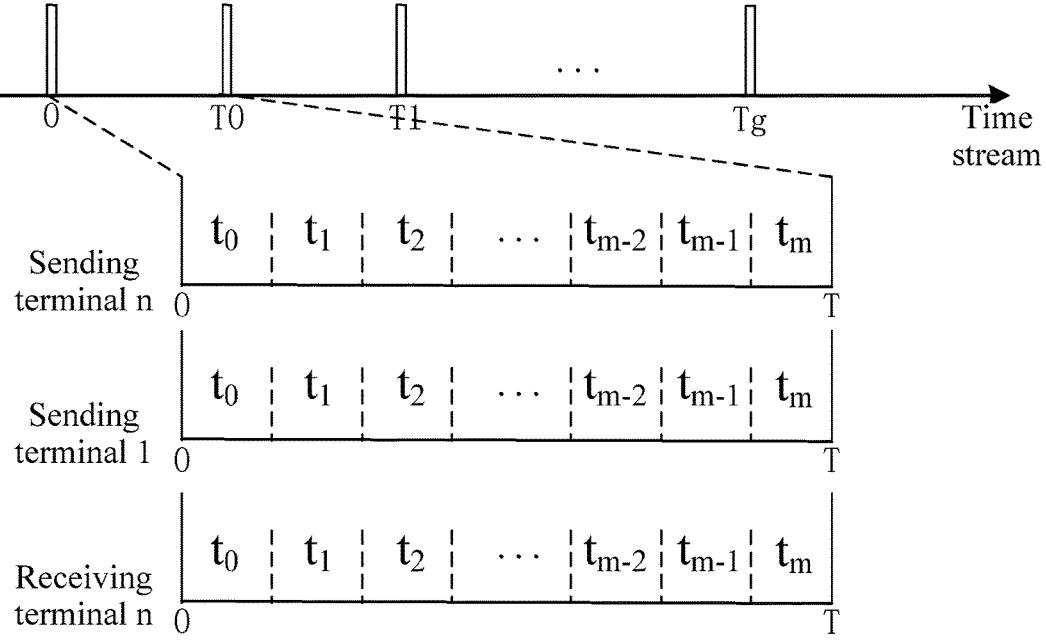
FIG. 5 is a diagram of sending a synchronization pulse signal according to an embodiment of the present application.

As shown in FIG. 5, to achieve the synchronization of the time slice of the acquisition card and the time slice of the display card, the main control board sends a synchronization pulse signal to the sending terminal and the receiving terminal with the theoretical time corresponding to transmitting to-be-transmitted image frames as a period. All FPGAs in the current system synchronously start the sending and reception of data after receiving the pulse signal, ensuring that the time slice when the acquisition card sends each frame of image data and the time slice when the display card receives the each frame of image data are absolutely synchronized.

In S260, the sending terminal is controlled to send the to-be-transmitted image corresponding to the transmission time to the receiving terminal within the time duration corresponding to the transmission time.

In the embodiment of the present application, the corresponding relationship is pre-established, so that the acquisition card performs orderly image transmission according to the corresponding relationship; therefore, the image transmission efficiency is improved while the image quality is ensured and the hardware structure is not changed.

The image transmission method of the present application is implemented in an FPGA+PCIe distributed application system. An FPGA serves as an EP to send or receive data, and the volume of data which can be received or sent per unit of time by the FPGA is limited by the bandwidth of PCIe. In the embodiment, a device carried on the FPGA and serving as a sending terminal for data sending is an acquisition card, and a device carried on the FPGA and serving as a receiving terminal for data reception is a display card. The acquisition card can simultaneously acquire image data in multiple channels, and can also simultaneously send image data in multiple channels out.

In the present application, theoretical time (T) corresponding to transmitting image frames is cut into multiple equal time parts according to the size of an image frame for transmission in each channel, and all time slices are uniformly managed and allocated. For the acquisition card, it is necessary to allocate a time slice to the acquisition card before the acquisition card sends image data so that the acquisition card sends the image data within a time duration corresponding to the time slice.

In the FPGA+PCIe distributed application system, the display card receives data passively, and the acquisition card sends data actively. Therefore, at the data sending end, that is, the acquisition card side, the problem of peak bandwidth overload occurring when the display card receives data can be solved as long as the order of time slices for sending image data of the acquisition card within a frame is controlled. The process of allocating a time slice to a frame of to-be-sent image data in a channel of an acquisition card is described as an example to illustrate the process of allocating time slices.

Figure 6:
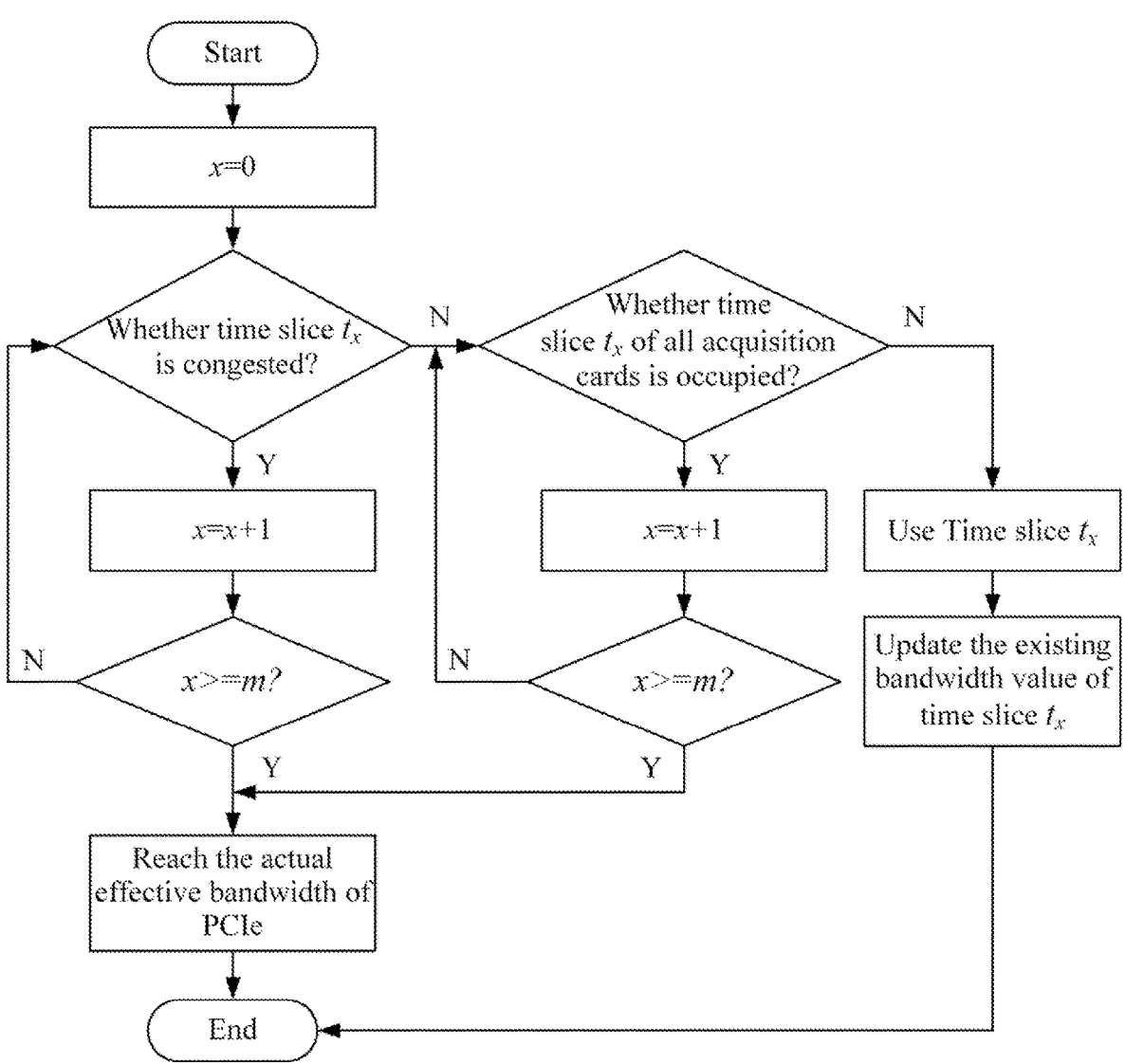
FIG. 6 is a flowchart of an implementation of an image transmission method according to an embodiment of the present application.

As shown in FIG. 6, a flag $x(0 \le x \le m)$ for sequentially determining time slices is initialized to be consistent with an initial serial number. Since serial numbers of time slices in the embodiment are $t_0$, $t_1$, $t_2$, . . . , $t_{m-2}$, $t_{m-1}$ and $t_m$, x is initialized to be 0.

Whether the display card is congested within a time slice with the serial number of $t_x$ is determined, where the display card is a display card receiving image data to be sent by an acquisition card. Whether the display card is congested is determined through the method described below. A bandwidth value (that is, an existing bandwidth value) of image data normally transmitted by the display card within the time slice with the serial number of $t_x$ is acquired and is added to a bandwidth value of image data to be sent by the acquisition card. If the sum of the bandwidth value of the image data normally transmitted by the display card within the time slice with the serial number of $t_x$ and the bandwidth value of the image data to be sent by the acquisition card is greater than the actual effective bandwidth (that is, the bandwidth threshold between the display card and the acquisition card) of PCIe, it is considered that the display card is congested; if the sum is not greater than the actual effective bandwidth of PCIe, it is considered that the display card is not congested. If the display card is congested, a next time slice of the display card is continuously traversed.

If no time slice within which the display card is not congested is found after all time slices are traversed, it is indicated that the current display card has reached the actual effective bandwidth of PCIe, and then this time of allocation operation is stopped.

If time slice $t_x$ satisfying the non-congestion condition is found and time slice $t_x$ of the acquisition card is not occupied by other services, the time slice is used. The existing bandwidth value of the time slice is added to the bandwidth value of the image data to be sent by the current acquisition card to obtain a new existing bandwidth value.

If time slice $t_x$ satisfying the non-congestion condition is found but time slice $t_x$ of the acquisition card is occupied by other services, a next time slice of the acquisition card is continuously traversed. Through the preceding steps, the time slice for sending the image data currently to be sent by the acquisition card can be acquired.

The embodiment provides the method of slicing time, and provides the method of controlling the sending time of the image data sending end within the theoretical time corresponding to transmitting frames of image data according to the congestion situation of each time slice, so that the bandwidth congestion of PCIe of the data receiving end caused by concurrent sending is effectively alleviated. Moreover, the solution greatly improves the bandwidth utilization of PCIe while ensuring the image quality.

In the embodiment of the present application, an image transmission method and the image transmission method provide in the present application are compared for illustration based on the FPGA+PCIe distributed application system.

Figures 7, 8, 9:
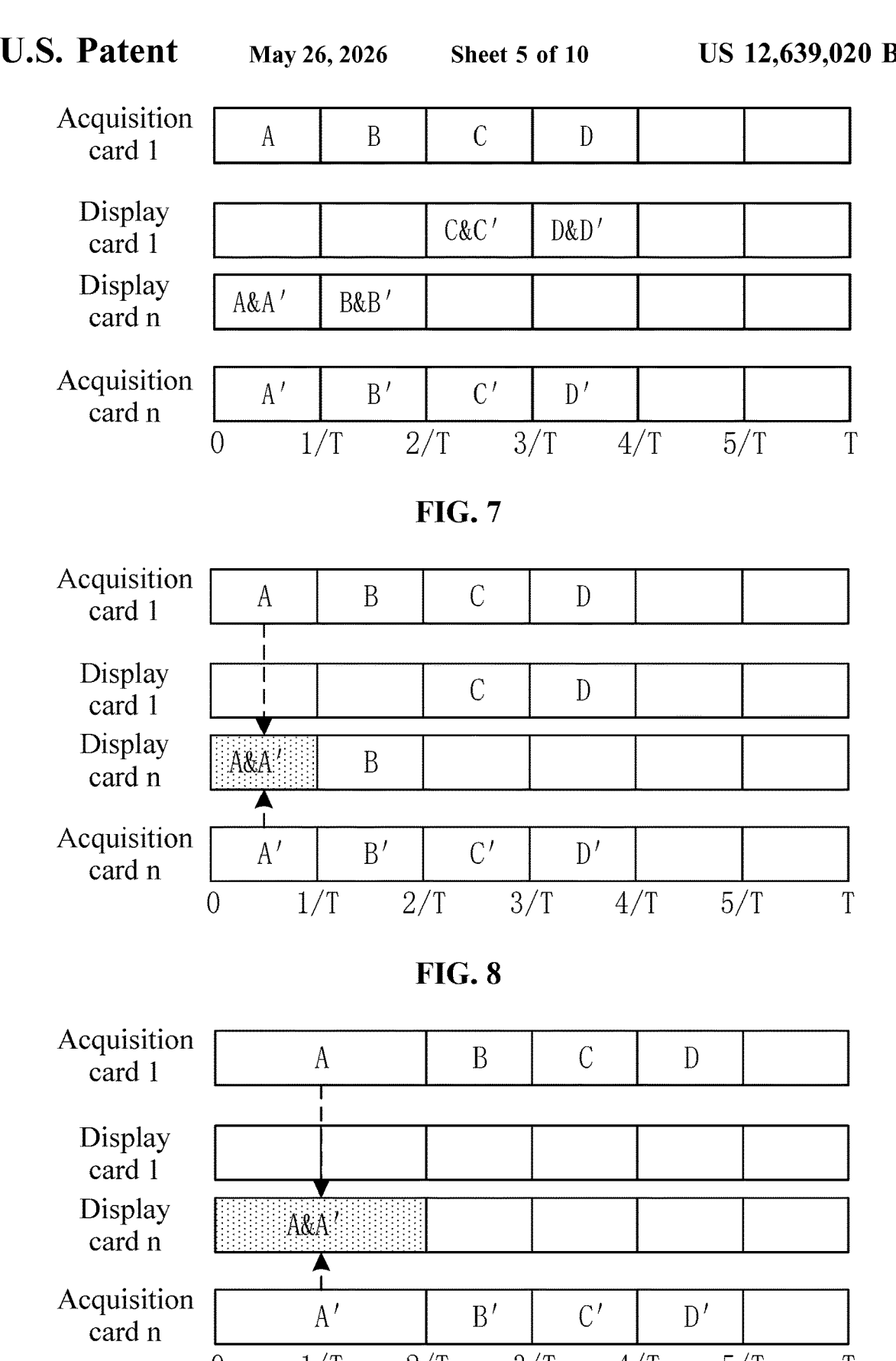
FIG. 7 is a diagram showing a theoretical flow direction of image data of an FPGA+PCIe distributed application system according to an embodiment of the present application.
FIG. 8 is a diagram of an allocation for image data A and image data A' according to an embodiment of the present application.
FIG. 9 is a diagram of sending preemption occurring in a case of an allocation for image data A and image data A' according to an embodiment of the present application.

As shown in FIG. 7, in the FPGA+PCIe distributed application system, it is assumed that acquisition card 1 and acquisition card n acquire and send image data in multiple channels with the resolution of 1920*1200 and in the YUV422 format to display card 1 and display card n, respectively, each acquisition card output image data in the multiple channels, and each display card is input into image data in the multiple channels. The PCIe bandwidth between the acquisition card and the display card is X2, and it can be seen according to the utilization of the PCIe bandwidth that the actual effective bandwidth of the PCIe bandwidth is 6.6 Gbps, that is, the bandwidth threshold between the sending terminal and the receiving terminal is 6.6 Gbps.

Image data is transmitted between the acquisition card and the display card at the rate of 30 frames/seconds, and it can be calculated that the bandwidth occupied by image data in one channel satisfies that 1920*1200*16*30/1000/1000/1000=1.1 Gbps. For the acquisition card and the display card, 6 frames of image data corresponding to 6 channels can be sent and received within the theoretical time of T (T=1/30 s) corresponding to transmitting frames of image data.

The theoretical time (T) corresponding to transmitting frames of image data is divided into 6 equal parts for image data transmission, and the image data sent by acquisition card 1 is image data A, image data B, image data C and image data D. Image data sent by acquisition card n are image data A', image data B', image data C' and image data D'. Image data A, image data B, image data A' and image data B' are sent to display card n, and image data C, image data D, image data C' and image data D' are sent to display card 1.

A case where multiple acquisition cards simultaneously send image data to a display card exists in the distributed application scene. Acquisition card 1 and acquisition card n may simultaneously send image data to the same display card, resulting in instantaneous bandwidth overload of PCIe of the display card; then the data is pressed back to the acquisition cards, and the acquisition cards alternately send image data to the display card. Theoretically, the acquisition cards can complete the sending of image data within time of t; however, the acquisition cards actually completes the sending of the image data within, thereby causing a playing freezing because of the reducing of the transmission frame rate.

For the FPGA+PCIe distributed application scene set in FIG. 7, a transmission method is described below.

As shown in FIG. 8, when image data A of acquisition card 1 and image data A' of acquisition card n are simultaneously sent to display card n, preemption is caused between image data A and image data A' during 0–(1/T) of display card n.

As shown in FIG. 9, image data A and image data A' are sent simultaneously, resulting in image data A and image data A' being pressed back to the acquisition cards; then the data packet of image data A and the data packet of image data A' are alternately sent, occupying time of (2/T).

Figure 10:
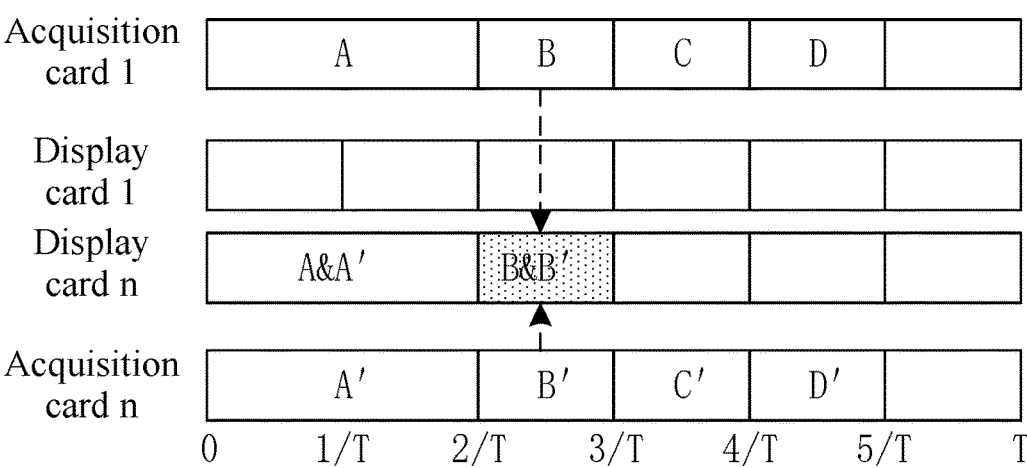
FIG. 10 is a diagram of an allocation for image data B and image data B' according to an embodiment of the present application.

As shown in FIG. 10, image data B and image data B' are sent from moment of 2/T, and preemption occurs between image data B and image data B' during (2/T)–(3/T) of display card n.

Figure 11:
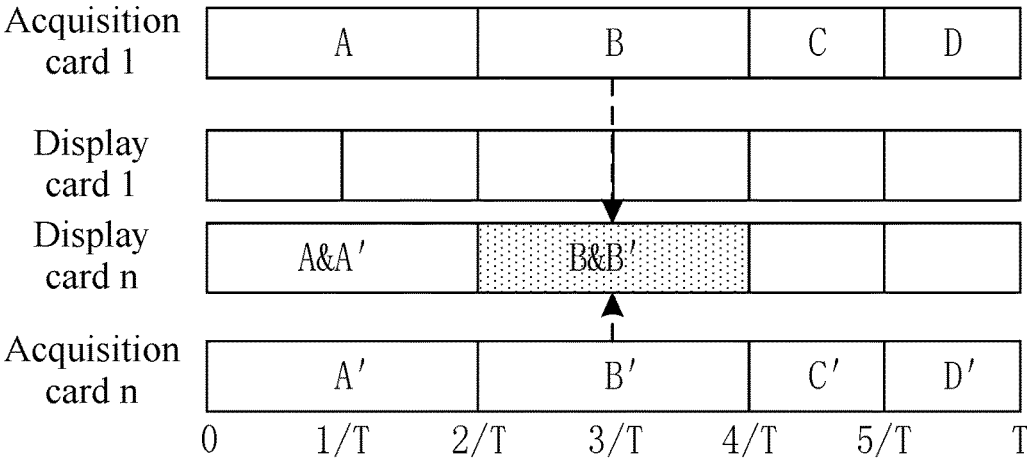
FIG. 11 is a diagram of sending preemption occurring in a case of an allocation for image data B and image data B' according to an embodiment of the present application.

As shown in FIG. 11, the preemption between image data B and image data B' leads to that image data B and image data B' are pressed back to the acquisition cards; then the data packet of image data B and the data packet of image data B' are alternately sent, occupying time of (2/T)–(4/T).

Figure 12:
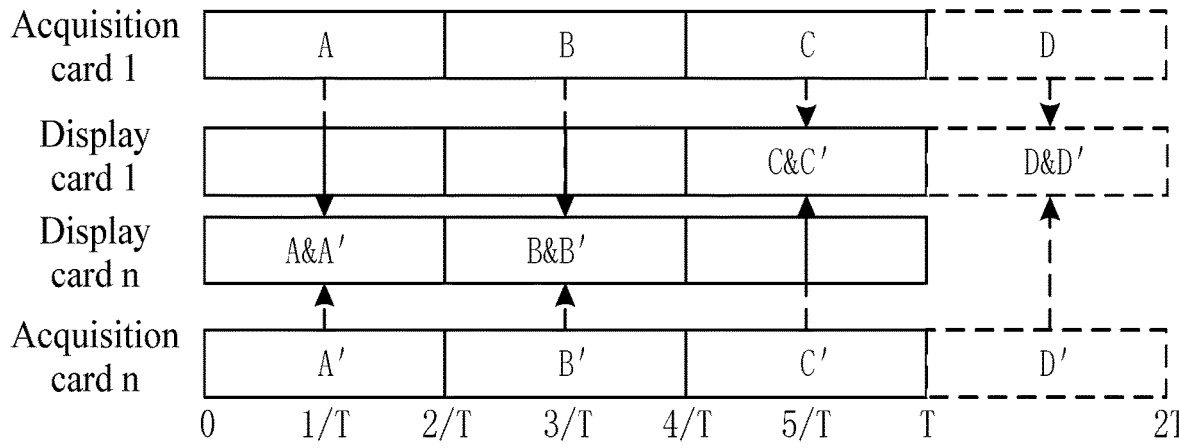
FIG. 12 is a diagram showing a preemption result in a case of allocation for image according to an embodiment of the present application.

As shown in FIG. 12, similarly, preemption occurs between image data C and image data C' as well as image data D and image data D', and the final result of the preemption is that the sending time is extended.

In the embodiment, image data D and image data D' should have been sent within time of T, but the sending is not completed due to the peak bandwidth overload of the display card. In this case, due to the PCIe packet sending mechanism, image data D and image data D' will be sent using a single frame of time. The sending process of image data A, image data B, image data C and image data D and image data A', image data B', image data C' and image data D' should have been sent within a frame of time, that is, time of T; however, time of 2T is actually used, and the total frame rate is that 30/2=15 frames, so that the decrease of the frame rate causes image freezing.

Figure 13:
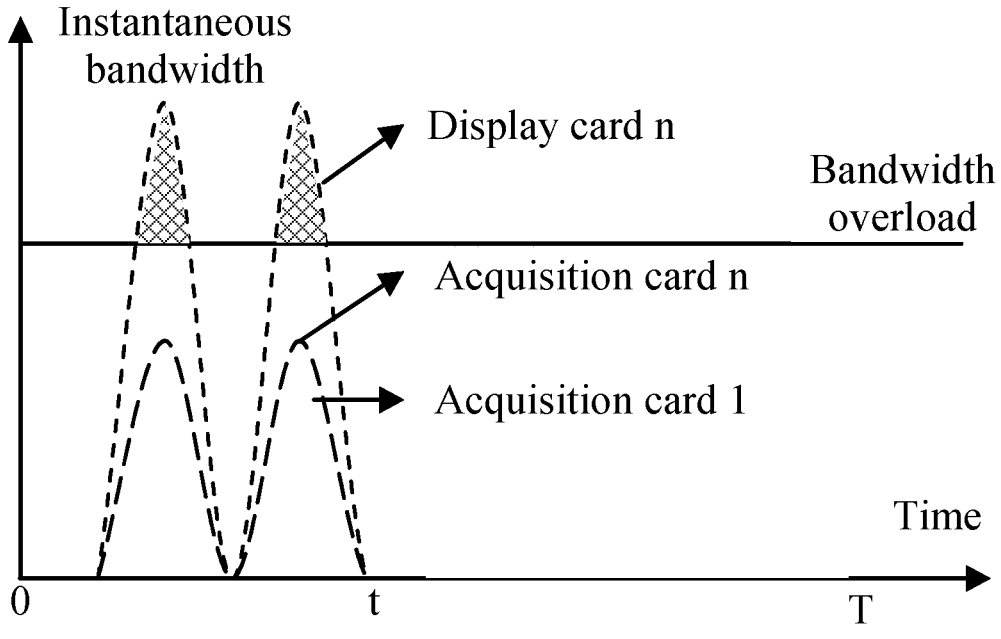
FIG. 13 is a diagram showing instantaneous bandwidth overload of a display card according to an embodiment of the present application.

As shown in FIG. 13, the bandwidth of the display card is instantaneously overloaded, that is, in the same time duration, the total image data volume of image data sent by multiple acquisition cards of the display card exceeds the actual effective bandwidth of PCIe, resulting in the instantaneous bandwidth overload of the display card.

Theoretically, for the display card, the PCIe bandwidth when image data in 4 channels is input satisfies that 4*1920*1200*16*30/1000/1000/1000=4.4 Gbps, and this value is significantly less than 6.6 Gbps. However, the instantaneous bandwidth overload of the display card leads to back pressing to the acquisition cards, causing playing freezing.

It is assumed that the actual effective bandwidth of PCIe is currently X (Gbps) ((Gbps) refers to the bandwidth unit of PCIe transmission). If the data volume corresponding to a frame of image data is Q, the bandwidth of data received within the theoretical time (time of T) corresponding to transmitting frames of image data satisfies the following formula:

$$\frac{Q}{T} \leq X \ (Gbps). \tag{1}$$

In formula (1), when Q is constant, the smaller T, the larger the value of Q/T. In FIG. 13, t<T; therefore, Q/t>X (Gbps), so that the peak bandwidth overload is caused; the peak bandwidth overload leads to bandwidth preemption on the data sending end, resulting in pressing back; after the pressing back, the data sending frame rate is reduced, leading to playing freezing.

Therefore, in the embodiment of the present application, a frame of time (T) is cut into multiple equal time parts according to the size of an image frame for transmission in each channel, and time slices are uniformly managed and allocated.

As shown in formula (1), the actual time taken by time slice $t_x$ obtained after cutting in the process of transmitting an image frame is a ratio value of the total data volume of to-be-transmitted image data corresponding to the current time slice to the actual effective bandwidth X (Gbps) of PCIe. If the total data volume corresponding to time slice $t_0$ is $Q_0$, then the actual time taken by time slice $t_0$ is $Q_0/X$.

When the number of slices obtained after the theoretical time corresponding to transmitting frames of image data is cut is p and each time slice is allocated image, it is satisfied that $T=Q_0/X+Q_1/X+ \ldots +Q_p/X$.

According to the setting of the data transmission specification in the embodiment of the present application, the size of all transmitted images is 1920*1200, the used PCIe bandwidth is X2, and it can be seen according to the bandwidth utilization of PCIe that the actual effective bandwidth X of PCIe is 6.6 Gbps. Transmission is performed at the rate of 30 frames/seconds with a frame of time T of 1/30 s=33 ms. The total data volume $Q_x$ corresponding to time slice $t_x$ of transmitting an image frame in a channel satisfies that $Q_x$=1920*1200*16/1000/1000/1000=0.037 Gb. From the above, $t_x$ can be calculated that $t_x$=0.037/6.6=5.5 ms, so that the number of effective slices after cutting satisfies that 33/5.5=6.

According to the cutting method of the embodiment of the present application, it can be seen that the actual time of each time slice varies according to the size of a transmitted image, and a default number of time slices are allocated before image transmission; however, the number of effective slices during actual image transmission is less than or equal to the default number of time slices. In the application scene of the embodiment, 32 time slices are allocated, and 6 time slices of the 32 time slices are actually working.

Effective time slices are also calculated in real time according to data allocation, that is, in practical applications, the number of effective slices cannot be determined before the data allocation is started, and if the data volume sent by the acquisition card becomes larger or smaller, the number of effective slices also changes accordingly. The data transmission specification is pre-defined in the embodiment, so that effective slice data is calculated to facilitate understanding.

For the FPGA+PCIe distributed application scene set in FIG. 7, the image transmission method of the present application is described below.

Figure 14:
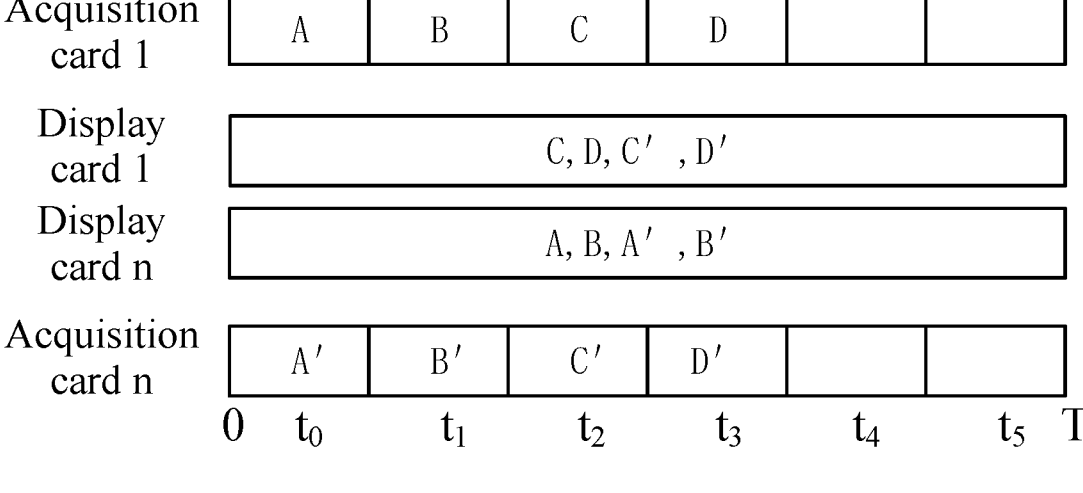
FIG. 14 is a diagram showing a planned flow direction of image data of an FPGA+PCIe distributed application system according to an embodiment of the present application.

By default, the theoretical time of T corresponding to transmitting frames of image data is cut into multiple time slices, for example, 32 time slices; however, since transmitted images has the same size, 6 effective time slices obtained from cutting the theoretical time of T corresponding to transmitting frames of image data are used. As shown in FIG. 14, images sent by acquisition card 1 are image A, image B, image C and image D, and images sent by acquisition card n are image A', image B', image C' and image D'. Image A, image B, image A' and image B' are sent to display card n, and image C, image D, image C' and image D' are sent to display card 1.

Figures 15, 16, 17:
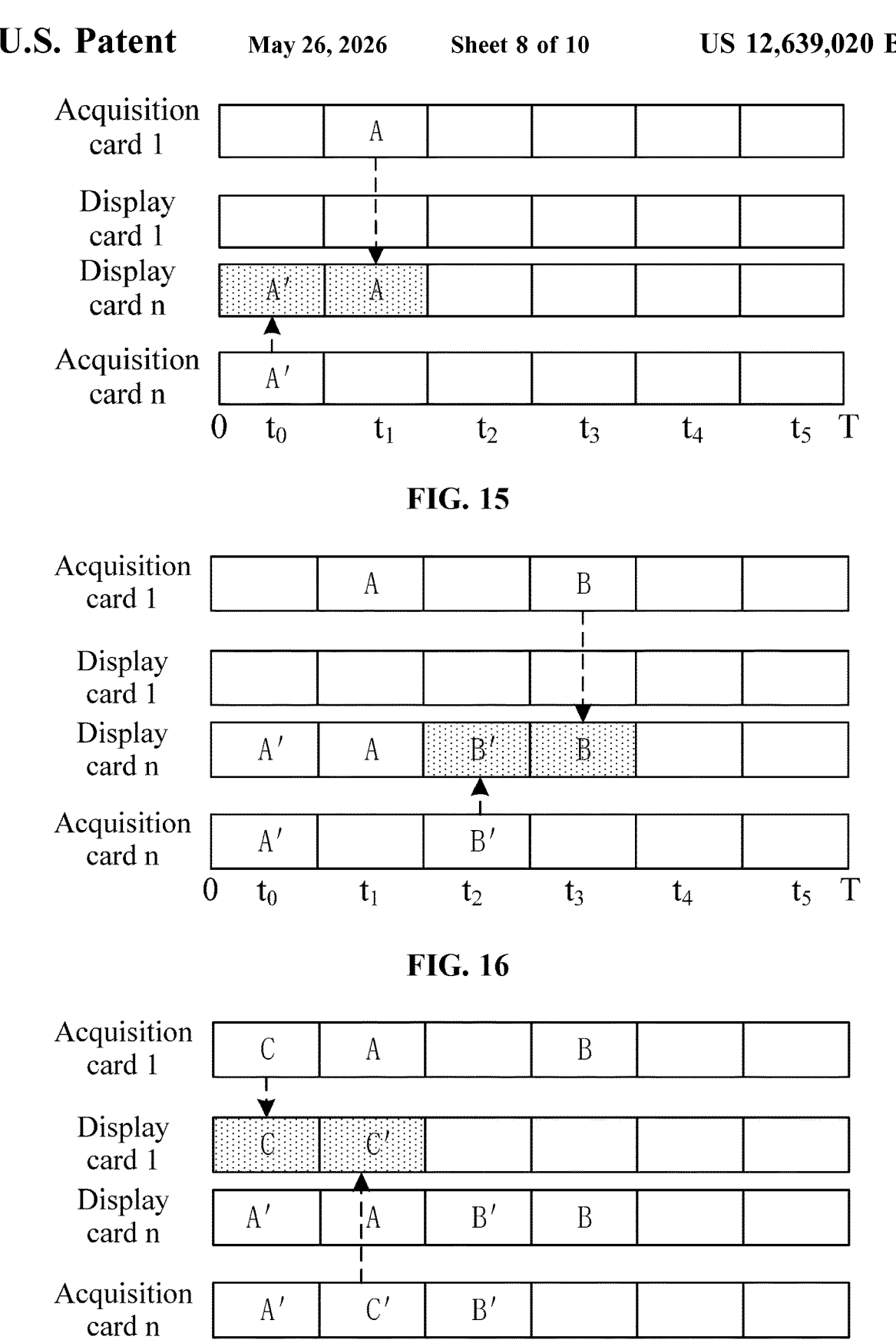
FIG. 15 is a diagram of allocating time slices to image data A and image data A' according to an embodiment of the present application.
FIG. 16 is a diagram of allocating time slices to image data B and image data B' according to an embodiment of the present application.
FIG. 17 is a diagram of allocating time slices to image data C and image data C' according to an embodiment of the present application.

As shown in FIG. 15, when data of image A' of acquisition card n is sent to display card n, a time slice is first allocated according to the time slice congestion situation of display card n. When image A' is sent, time slice $t_0$ of display card n is not congested and time slice $t_0$ of acquisition card n is not occupied, so that sending time slice $t_0$ is allocated to image A'. When image A of acquisition card 1 is sent to display card n, time slice $t_0$ of display card n is congested, and time slice $t_1$ of display card n is not congested and time slice $t_1$ of acquisition card 1 is not occupied, so that time slice $t_1$ is allocated to image A.

As shown in FIG. 16, when image B' of acquisition card n is sent, time slice $t_0$ and time slice $t_1$ of display card n are congested, and time slice $t_2$ of display card n is not congested and time slice $t_2$ of acquisition card n is not occupied, so that time slice $t_2$ is allocated to image B'. When image B of acquisition card 1 is sent to display card n, time slices to, time slice $t_1$ and time slice $t_2$ of display card n are all congested, and time slice $t_3$ of display card n is not congested and time slice $t_3$ of acquisition card 1 is not occupied, so that time slice $t_3$ is allocated to image B.

As shown in FIG. 17, when data of image C' of acquisition card n is sent to display card 1, a time slice is first allocated according to the time slice congestion situation of display card 1. When image C' is sent, time slice $t_0$ of display card 1 is not congested, but time slice $t_0$ of acquisition card n is already occupied, and at this time, time slice $t_0$ of acquisition card 1 is not occupied, so that time slice $t_0$ of display card 1 and time slice $t_0$ of acquisition card 1 are allocated to image C of acquisition card 1. When allocation is continued for image C' of acquisition card n, time slice $t_1$ of display card 1 is not congested and time slice $t_1$ of acquisition card n is not occupied, so that sending time slice $t_1$ is allocated to image C'.

Figure 18:
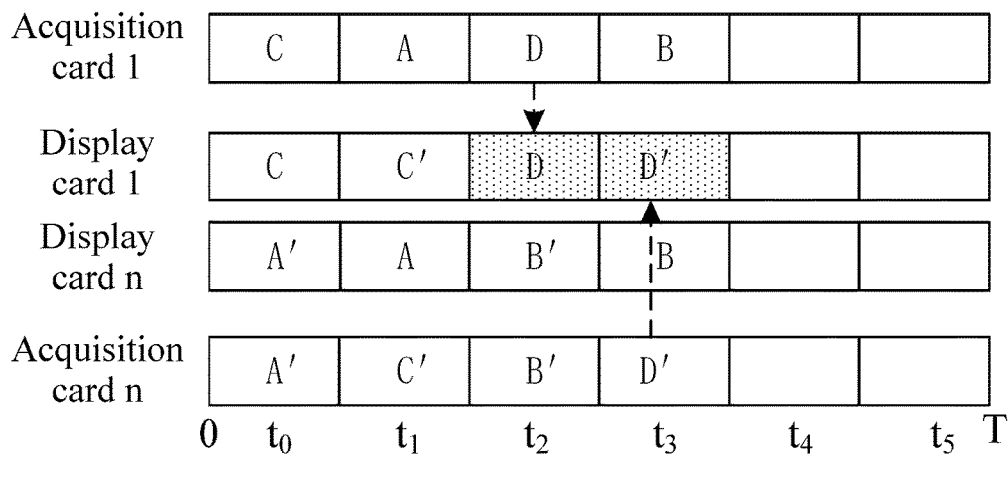
FIG. 18 is a diagram of allocating time slices to image data D and image data D' according to an embodiment of the present application.

As shown in FIG. 18, when data of image D' of acquisition card n is sent to display card 1, a time slice is first allocated according to the time slice congestion situation of display card 1. When image D' is sent, time slice $t_2$ of display card 1 is not congested, but time slice $t_2$ of acquisition card n is already occupied, and at this time, time slice $t_2$ of acquisition card 1 is not occupied, so that time slice $t_2$ of display card 1 and time slice $t_2$ of acquisition card 1 are first allocated to image D of acquisition card 1 waiting for allocation. When allocation is continued for image D' of acquisition card n, time slice $t_3$ of display card 1 is not congested and time slice $t_3$ of acquisition card n is not occupied, so that sending time slice $t_3$ is allocated to image D'.

Image data transmitted within corresponding time slices after the allocation is completed is shown in FIG. 18. At this time, the actual number of slices of the acquisition cards and the actual number of slices of the display cards are both 4, and the actual time of each time slice is calculated according to the total data volume of image data within the time slice. For example, the actual time of time slice $t_0$ of acquisition card 1 is dividing the data volume of image C by the current actual effective bandwidth of PCIe.

Figure 19:
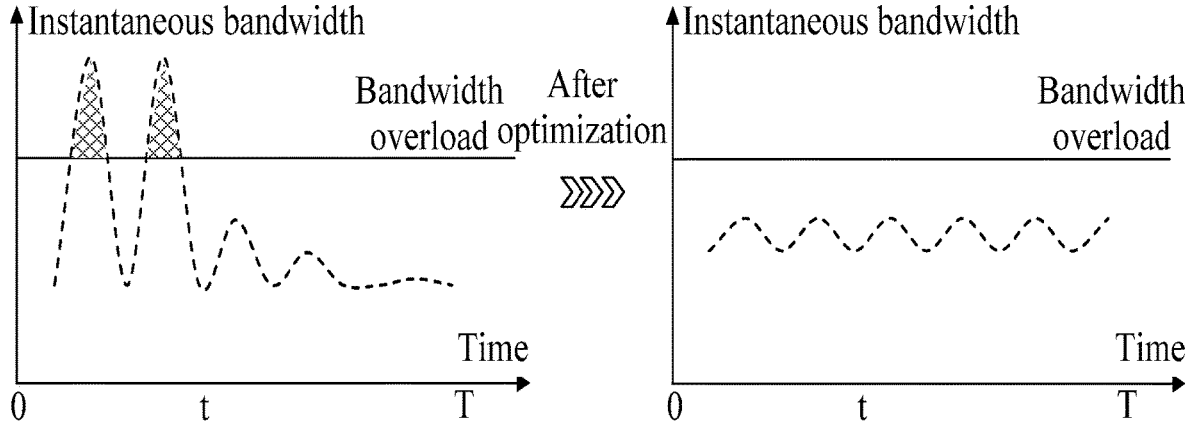
FIG. 19 is a diagram showing comparison of instantaneous bandwidths in image transmission according to an embodiment of the present application.

As shown in FIG. 19, the left part of FIG. 19 is a diagram showing an instantaneous bandwidth of data transmission in the related art, the right part of FIG. 19 is a diagram showing an instantaneous bandwidth of data transmission in the present application. It can be seen from the figure that the image transmission method of the present application effectively alleviates the image freezing problem caused by the instantaneous bandwidth overload of PCIe shown in the left part of FIG. 19 when the total data volume of a frame of image data is unchanged, and effectively improves the bandwidth utilization of PCIe.

Figure 20:
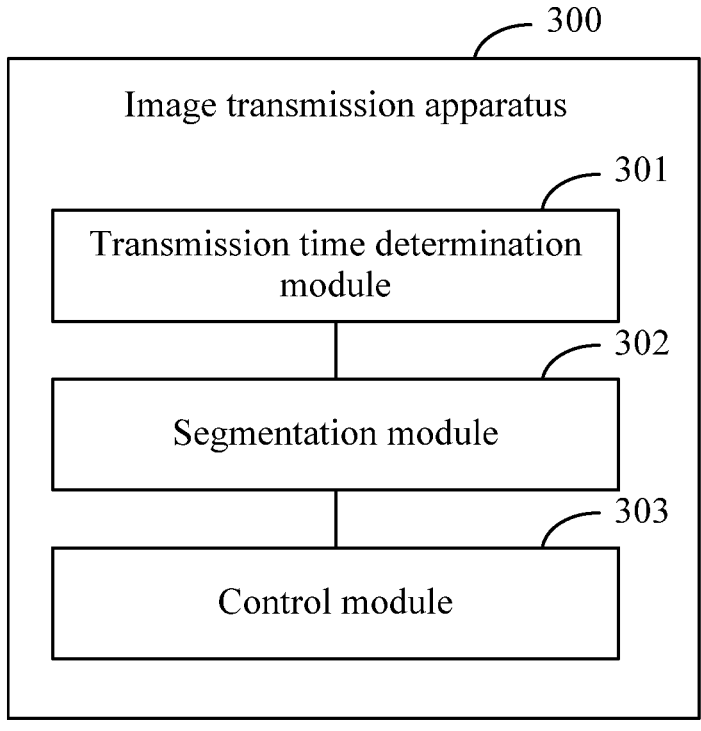
FIG. 20 is a structural diagram of an image transmission apparatus according to an embodiment of the present application.

FIG. 20 is a structural diagram of an image transmission apparatus according to an embodiment of the present application. Referring to FIG. 20, an embodiment of the present application discloses an image transmission apparatus 300.

The apparatus 300 includes a transmission time determination module 301, a segmentation module 302 and a control module 303.

The transmission time determination module 301 is configured to determine, according to the data volume of a to-be-transmitted image frame in each channel of a sending terminal and a transmission bandwidth between the sending terminal and a receiving terminal, transmission time needed by the sending terminal to transmit a to-be-transmitted image frame in each channel. The segmentation module 302 is configured to segment, according to the transmission time needed by the sending terminal to transmit a to-be-transmitted image frame in each channel, theoretical time corresponding to transmitting to-be-transmitted image frames to obtain a time duration corresponding to the transmission time. The control module 303 is configured to control the sending terminal to send a to-be-transmitted image frame corresponding to the transmission time to the receiving terminal within the time duration corresponding to the transmission time.

In the embodiment of the present application, the segmentation module 302 further includes a preset number determination unit and a time duration segmentation unit.

The preset number determination unit is configured to, in a case where transmitting a to-be-transmitted image frame in multiple channels separately needs the same transmission time, determine a preset number according to the number of channels of the sending terminal and/or a ratio of the theoretical time corresponding to transmitting to-be-transmitted image frames to the transmission time. The time duration segmentation unit is configured to perform average segmentation on the theoretical time corresponding to transmitting to-be-transmitted image frames according to the preset number to obtain a preset number of time durations.

In the embodiment of the present application, the preset number determination unit is configured to set the preset number to be equal to the number of channels of the sending terminal, set the preset number to be equal to the ratio of the theoretical time corresponding to transmitting to-be-transmitted image frames to the transmission time, or set the preset number to a value between the number of channels of the sending terminal and the ratio.

In the embodiment of the present application, if at least two sending terminals exist, the segmentation module 302 includes an alternate segmentation unit.

The alternate segmentation unit is configured to alternately segment the theoretical time corresponding to transmitting to-be-transmitted image frames according to transmission time needed for transmitting a to-be-transmitted image frame corresponding to the at least two sending terminals to obtain time durations corresponding to the transmission time.

In the embodiment of the present application, the apparatus further includes a to-be-transmitted image determination module and a corresponding relationship establishment module.

The to-be-transmitted image determination module is configured to determine a to-be-transmitted image for being transmitted within transmission time corresponding to each time duration. The corresponding relationship establishment module is configured to establish a corresponding relationship between the each time duration, the to-be-transmitted image, a sending terminal for sending the to-be-transmitted image and a receiving terminal for receiving the to-be-transmitted image so that the sending terminal sends the to-be-transmitted image according to the corresponding relationship.

In the embodiment of the present application, if at least two sending terminals exist, the corresponding relationship establishment module includes a traversal unit and a relationship establishment unit.

The traversal unit is configured to traverse multiple time durations from a starting moment, and determine whether the receiving terminal is allocated an established corresponding relationship within a current time duration. The relationship establishment unit is configured to, in a case where the receiving terminal is not allocated an established corresponding relationship within the current time duration, determine a sending terminal which is not allocated an established corresponding relationship within the current time duration, and establish a corresponding relationship between the current time duration, the sending terminal, a to-be-transmitted image waiting for allocation of the sending terminal and the receiving terminal.

In the embodiment of the present application, the control module 303 is configured to send a synchronization pulse signal to the sending terminal and the receiving terminal with the theoretical time corresponding to transmitting to-be-transmitted image frames as a period to instruct the sending terminal to start sending of a to-be-transmitted image and to instruct the receiving terminal to synchronously start reception of the to-be-transmitted image.

The image transmission apparatus provided in the embodiment of the present application can perform the image transmission method provided in any embodiment of the present application and has functional modules for and effects of performing the method.

According to an embodiment of the present application, the present application further provides an electronic device and a readable storage medium.

Figure 21:
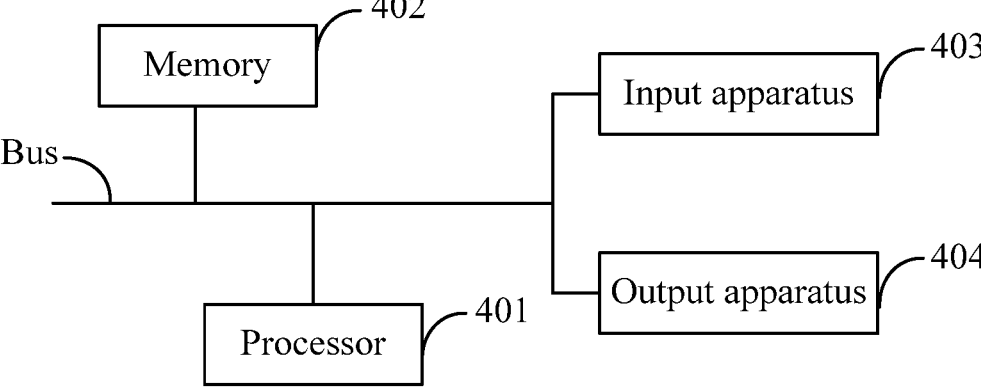
FIG. 21 is a block diagram of an electronic device for implementing an image transmission method according to an embodiment of the present application.

As shown in FIG. 21, FIG. 21 is a block diagram of an electronic device for implementing an image transmission method according to an embodiment of the present application. Electronic devices are intended to represent various forms of digital computers, for example, laptop computers, desktop computers, worktables, personal digital assistants, servers, blade servers, mainframe computers or other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present application as described and/or claimed herein.

As shown in FIG. 21, the electronic device includes one or more processors 401, a memory 402 and interfaces for connecting multiple components, where the interfaces include a high-speed interface and a low-speed interface. The multiple components are interconnected to each other by different buses and may be mounted on a common mainboard or in other manners as desired. The processor may process instructions executed in the electronic device, including instructions stored in or on the memory to make graphic information of a graphical user interface (GUI) displayed on an external input/output apparatus (such as a display device coupled to an interface). In other embodiments, if needed, multiple processors and/or multiple buses may be used with multiple memories. Similarly, multiple electronic devices may be connected and provide some necessary operations (for example, serving as a server array, a set of blade servers or a multi-processor system). A processor 401 is used as an example in FIG. 21.

The memory 402 is the non-transitory computer-readable storage medium provided in the present application. The memory stores instructions executable by at least one processor to cause the at least one processor to perform the image transmission method provided in the present application. The non-transitory computer-readable storage medium of the present application stores computer instructions for causing a computer to perform the image transmission method provided in the present application.

The memory 402, as a non-transitory computer-readable storage medium, can be used for storing non-transitory software programs, non-transitory computer-executable programs and modules, for example, program instructions/modules (for example, the transmission time determination module 301, the segmentation module 302 and the control module 303 shown in FIG. 20) corresponding to the image transmission method in the embodiments of the present application. The processor 401 executes non-transitory software programs, instructions and modules stored in the memory 402 to execute various function applications and data processing of a server, that is, to implement the image transmission method provided in the preceding method embodiments.

The memory 402 may include a program storage region and a data storage region, where the program storage region may store an operating system and an application program needed by at least one function while the data storage region may store data created according to use of an electronic device for image transmission. Additionally, the memory 402 may include a high-speed random-access memory and a non-transitory memory, for example, at least one disk memory, a flash memory or another non-transitory solid-state memory. In some embodiments, the memory 402 optionally includes memories which are disposed remotely relative to the processor 401. These remote memories may be connected to the electronic device for image transmission via a network. Examples of the preceding network include, but are not limited to, the Internet, an intranet, a local area network, a mobile communication network and a combination thereof.

The electronic device for performing the image transmission method may further include an input apparatus 403 and an output apparatus 404. The processor 401, the memory 402, the input apparatus 403 and the output apparatus 404 may be connected by a bus or in other manners. FIG. 21 uses connection by a bus as an example.

The input apparatus 403 may receive input number or character information and generate key signal input related to user settings and function control of the electronic device for image transmission; for example, the input apparatus 403 may be a touchscreen, a keypad, a mouse, a trackpad, a touchpad, a pointing stick, one or more mouse buttons, a trackball or a joystick. The output apparatus 404 may include, for example, a display device, an auxiliary lighting apparatus (for example, a light-emitting diode (LED)) or a haptic feedback apparatus (for example, a vibration motor). The display apparatus may include, but is not limited to, a liquid-crystal display (LCD), an LED display or a plasma display. In some embodiments, the display apparatus may be a touchscreen.

The various embodiments of the systems and techniques described herein may be implemented in digital electronic circuitry, integrated circuitry, an application-specific integrated circuit (ASIC), computer hardware, firmware, software and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting data and instructions to the memory system, the at least one input apparatus and the at least one output apparatus.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus for providing machine instructions and/or data for a programmable processor, such as a magnetic disk, an optical disc, a memory or a programmable logic device (PLD). The term "machine-readable medium" or "computer-readable medium" includes a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display apparatus for displaying information to the user, such as a cathode-ray tube (CRT) or a LCD monitor, and a keyboard and a pointing apparatus such as a mouse or a trackball through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

A computing system may include a client and a server. The client and the server are usually far away from each other and generally interact through the communication network. The relationship between the client and the server arises by virtue of computer programs running on respective computers and having a client-server relationship to each other.

Various forms of the preceding flows may be used, with steps reordered, added or removed. For example, the steps described in the present application may be executed in parallel, in sequence or in a different order as long as the desired results of the technical solutions provided in the present application are achieved. The execution sequence of these steps is not limited herein.

What is claimed is:

1. An image transmission method, comprising:

according to a data volume of a to-be-transmitted image frame in each channel of a plurality of channels of a sending terminal and a transmission bandwidth between the sending terminal and a receiving terminal, determining a respective transmission time needed by the sending terminal to transmit the to-be-transmitted image frame in each channel;

according to the respective transmission time needed by the sending terminal to transmit the to-be-transmitted image frame in each channel, segmenting theoretical time needed by the sending terminal to transmit to-be-transmitted image frames in the plurality of channels into a plurality of time durations to obtain a respective time duration corresponding to the respective transmission time; and controlling the sending terminal to send the to-be-transmitted image frame corresponding to the respective transmission time to the receiving terminal within the respective time duration corresponding to the respective transmission time;

wherein according to the respective transmission time needed by the sending terminal to transmit the to-be-transmitted image frame in each channel, segmenting the theoretical time needed by the sending terminal to transmit the to-be-transmitted image frames in the plurality of channels into a plurality of time durations to obtain the respective time duration corresponding to the respective transmission time comprises:

in a case where at least two sending terminals exist, according to the respective transmission time needed by each sending terminal of the at least two sending terminals to transmit a to-be-transmitted image frame in each channel of each sending terminal, alternately segmenting theoretical time needed by the at least two sending terminals to transmit to-be-transmitted image frames in channels of the at least two sending terminals into the plurality of time durations to obtain the respective time duration corresponding to the respective transmission time.

2. The method according to claim 1, wherein according to the respective transmission time needed by the sending terminal to transmit the to-be-transmitted image frame in each channel, segmenting the theoretical time needed by the sending terminal to transmit the to-be-transmitted image frames in the plurality of channels into the plurality of time durations to obtain the respective time duration corresponding to the respective transmission time comprises:

in a case where transmission times needed by the sending terminal to transmit the to-be-transmitted image frame in the plurality of channels are the same, determining a preset number according to at least one of a number of the plurality of channels of the sending terminal or a ratio of the theoretical time to the transmission time; and performing average segmentation on the theoretical time according to the preset number to obtain a preset number of time durations.

3. The method according to claim 2, wherein determining the preset number according to the at least one of the number of the plurality of channels of the sending terminal or the ratio of the theoretical time to the transmission time comprises one of:

setting the preset number to be equal to the number of the plurality of channels of the sending terminal;

setting the preset number to be equal to the ratio of the theoretical time to the transmission time; or setting the preset number to a value between the number of the plurality of channels of the sending terminal and the ratio.

4. The method according to claim 1, before controlling the sending terminal to send the to-be-transmitted image frame corresponding to the respective transmission time to the receiving terminal within the respective time duration corresponding to the respective transmission time, further comprising:

determining a to-be-transmitted image frame transmitted within the respective time duration corresponding to the respective transmission time; and establishing a corresponding relationship between the respective time duration, the to-be-transmitted image frame, a sending terminal for sending the to-be-transmitted image frame and a receiving terminal for receiving the to-be-transmitted image frame so that the sending terminal sends the to-be-transmitted image frame according to the corresponding relationship.

5. The method according to claim 4, wherein in a case where at least two sending terminals exist, establishing the corresponding relationship between the respective time duration, the to-be-transmitted image frame, the sending terminal for sending the to-be-transmitted image frame and the receiving terminal for receiving the to-be-transmitted image frame comprises:

traversing the plurality of time durations from a starting moment, and determining whether the receiving terminal is allocated establishment of a corresponding relationship within a current time duration; and in a case where the receiving terminal is not allocated the establishment of the corresponding relationship within the current time duration, determining a sending terminal which is not allocated an establishment of a corresponding relationship within the current time duration, and establishing a corresponding relationship between the current time duration, the sending terminal, a to-be-transmitted image waiting for allocation of the sending terminal and the receiving terminal.

6. The method according to claim 1, wherein controlling the sending terminal to send the to-be-transmitted image frame corresponding to the respective transmission time to the receiving terminal within the respective time duration corresponding to the respective transmission time comprises:

with the theoretical time as a period, sending a synchronization pulse signal to the sending terminal and the receiving terminal to instruct the sending terminal to start sending of the to-be-transmitted image and to instruct the receiving terminal to synchronously start reception of the to-be-transmitted image frame.

7. An electronic device, comprising:

at least one processor, and a memory communicatively connected to the at least one processor;

wherein the memory stores instructions executable by the at least one processor to cause the at least one processor to perform:

according to a data volume of a to-be-transmitted image frame in each channel of a plurality of channels of a sending terminal and a transmission bandwidth between the sending terminal and a receiving terminal, determining a respective transmission time needed by the sending terminal to transmit the to-be-transmitted image frame in each channel;

according to the respective transmission time needed by the sending terminal to transmit the to-be-transmitted image frame in each channel, segmenting theoretical time needed by the sending terminal to transmit to-be-transmitted image frames in the plurality of channels into a plurality of time durations to obtain a respective time duration corresponding to the respective transmission time; and controlling the sending terminal to send the to-be-transmitted image frame corresponding to the respective transmission time to the receiving terminal within the respective time duration corresponding to the respective transmission time;

wherein according to the respective transmission time needed by the sending terminal to transmit the to-be-transmitted image frame in each channel, segmenting the theoretical time needed by the sending terminal to transmit the to-be-transmitted image frames in the plurality of channels into a plurality of time durations to obtain the respective time duration corresponding to the respective transmission time comprises:

in a case where at least two sending terminals exist, according to the respective transmission time needed by each sending terminal of the at least two sending terminals to transmit a to-be-transmitted image frame in each channel of each sending terminal, alternately segmenting theoretical time needed by the at least two sending terminals to transmit to-be-transmitted image frames in channels of the at least two sending terminals into the plurality of time durations to obtain the respective time duration corresponding to the respective transmission time.

8. The electronic device according to claim 7, wherein, according to the respective transmission time needed by the sending terminal to transmit the to-be-transmitted image frame in each channel, the at least one processor segments the theoretical time needed by the sending terminal to transmit the to-be-transmitted image frames in the plurality of channels into the plurality of time durations to obtain the respective time duration corresponding to the respective transmission time by:

in a case where transmission times needed by the sending terminal to transmit the to-be-transmitted image frame in the plurality of channels are the same, determining a preset number according to at least one of a number of the plurality of channels of the sending terminal or a ratio of the theoretical time to the transmission time; and performing average segmentation on the theoretical time according to the preset number to obtain a preset number of time durations.

9. The electronic device according to claim 8, wherein the at least one processor determines the preset number according to the at least one of the number of the plurality of channels of the sending terminal or the ratio of the theoretical time to the transmission time by using one of:

setting the preset number to be equal to the number of the plurality of channels of the sending terminal;

setting the preset number to be equal to the ratio of the theoretical time to the transmission time; or setting the preset number to a value between the number of the plurality of channels of the sending terminal and the ratio.

10. The electronic device according to claim 7, wherein before controlling the sending terminal to send the to-betransmitted image frame corresponding to the respective transmission time to the receiving terminal within the respective time duration corresponding to the respective transmission time, the at least one processor is further configured to perform:

determining a to-be-transmitted image frame transmitted within the respective time duration corresponding to the respective transmission time; and establishing a corresponding relationship between the respective time duration, the to-be-transmitted image frame, a sending terminal for sending the to-be-transmitted image frame and a receiving terminal for receiving the to-be-transmitted image frame so that the sending terminal sends the to-be-transmitted image frame according to the corresponding relationship.

11. The electronic device according to claim 10, wherein in a case where at least two sending terminals exist, the at least one processor establishes the corresponding relationship between the respective time duration, the to-be-transmitted image frame, the sending terminal for sending the to-be-transmitted image frame and the receiving terminal for receiving the to-be-transmitted image frame by:

traversing the plurality of time durations from a starting moment, and determining whether the receiving terminal is allocated establishment of a corresponding relationship within a current time duration; and in a case where the receiving terminal is not allocated the establishment of the corresponding relationship within the current time duration, determining a sending terminal which is not allocated an establishment of a corresponding relationship within the current time duration, and establishing a corresponding relationship between the current time duration, the sending terminal, a to-be-transmitted image waiting for allocation of the sending terminal and the receiving terminal.

12. The electronic device according to claim 7, wherein the at least one processor controls the sending terminal to send the to-be-transmitted image frame corresponding to the respective transmission time to the receiving terminal within the respective time duration corresponding to the respective transmission time by:

with the theoretical time as a period, sending a synchronization pulse signal to the sending terminal and the receiving terminal to instruct the sending terminal to start sending of the to-be-transmitted image and to instruct the receiving terminal to synchronously start reception of the to-be-transmitted image frame.

13. A non-transitory computer-readable storage medium storing computer instructions for causing a computer to perform:

according to a data volume of a to-be-transmitted image frame in each channel of a plurality of channels of a sending terminal and a transmission bandwidth between the sending terminal and a receiving terminal, determining a respective transmission time needed by the sending terminal to transmit the to-be-transmitted image frame in each channel;

according to the respective transmission time needed by the sending terminal to transmit the to-be-transmitted image frame in each channel, segmenting theoretical time needed by the sending terminal to transmit to-be-transmitted image frames in the plurality of channels into a plurality of time durations to obtain a respective time duration corresponding to the respective transmission time; and controlling the sending terminal to send the to-be-transmitted image frame corresponding to the respective transmission time to the receiving terminal within the respective time duration corresponding to the respective transmission time;

wherein according to the respective transmission time needed by the sending terminal to transmit the to-be-transmitted image frame in each channel, segmenting the theoretical time needed by the sending terminal to transmit the to-be-transmitted image frames in the plurality of channels into a plurality of time durations to obtain the respective time duration corresponding to the respective transmission time comprises:

in a case where at least two sending terminals exist, according to the respective transmission time needed by each sending terminal of the at least two sending terminals to transmit a to-be-transmitted image frame in each channel of each sending terminal, alternately segmenting theoretical time needed by the at least two sending terminals to transmit to-be-transmitted image frames in channels of the at least two sending terminals into the plurality of time durations to obtain the respective time duration corresponding to the respective transmission time.

14. The non-transitory computer-readable storage medium according to claim 13, wherein, according to the respective transmission time needed by the sending terminal to transmit the to-be-transmitted image frame in each channel, the computer segments the theoretical time needed by the sending terminal to transmit the to-be-transmitted image frames in the plurality of channels into the plurality of time durations to obtain the respective time duration corresponding to the respective transmission time by:

in a case where transmission times needed by the sending terminal to transmit the to-be-transmitted image frame in the plurality of channels are the same, determining a preset number according to at least one of a number of the plurality of channels of the sending terminal or a ratio of the theoretical time to the transmission time; and performing average segmentation on the theoretical time according to the preset number to obtain a preset number of time durations.

15. The non-transitory computer-readable storage medium according to claim 14, wherein the computer determines the preset number according to the at least one of the number of the plurality of channels of the sending terminal or the ratio of the theoretical time to the transmission time by using one of:

setting the preset number to be equal to the number of the plurality of channels of the sending terminal;

setting the preset number to be equal to the ratio of the theoretical time to the transmission time; or setting the preset number to a value between the number of the plurality of channels of the sending terminal and the ratio.

16. The non-transitory computer-readable storage medium according to claim 13, wherein before controlling the sending terminal to send the to-be-transmitted image frame corresponding to the respective transmission time to the receiving terminal within the respective time duration corresponding to the respective transmission time, the computer is further configured to perform:

determining a to-be-transmitted image frame transmitted within the respective time duration corresponding to the respective transmission time; and establishing a corresponding relationship between the respective time duration, the to-be-transmitted image frame, a sending terminal for sending the to-be-transmitted image frame and a receiving terminal for receiving the to-be-transmitted image frame so that the sending terminal sends the to-be-transmitted image frame according to the corresponding relationship.

17. The non-transitory computer-readable storage medium according to claim 16, wherein in a case where at least two sending terminals exist, the computer establishes the corresponding relationship between the respective time duration, the to-be-transmitted image frame, the sending terminal for sending the to-be-transmitted image frame and the receiving terminal for receiving the to-be-transmitted image frame by:

traversing the plurality of time durations from a starting moment, and determining whether the receiving terminal is allocated establishment of a corresponding relationship within a current time duration; and in a case where the receiving terminal is not allocated the establishment of the corresponding relationship within the current time duration, determining a sending terminal which is not allocated an establishment of a corresponding relationship within the current time duration, and establishing a corresponding relationship between the current time duration, the sending terminal, a to-be-transmitted image waiting for allocation of the sending terminal and the receiving terminal.

18. The non-transitory computer-readable storage medium according to claim 13, wherein the computer controls the sending terminal to send the to-be-transmitted image frame corresponding to the respective transmission time to the receiving terminal within the respective time duration corresponding to the respective transmission time by:

with the theoretical time as a period, sending a synchronization pulse signal to the sending terminal and the receiving terminal to instruct the sending terminal to start sending of the to-be-transmitted image and to instruct the receiving terminal to synchronously start reception of the to-be-transmitted image frame.

* * * * *